United States Patent [19]

Loucks

[11] 4,436,876

[45] Mar. 13, 1984

[54] BLOCK COPOLYMERS OF POLYPHENYLENE OXIDES AND STERICALLY-HINDERED AROMATIC POLYCARBONATES

[75] Inventor: George R. Loucks, Scotia, N.Y.

[73] Assignee: General Electric Company, Schenectady, N.Y.

[21] Appl. No.: 400,497

[22] Filed: Jul. 21, 1982

Related U.S. Application Data

[62] Division of Ser. No. 250,511, Apr. 2, 1981, Pat. No. 4,377,662.

[51] Int. Cl.$^3$ .................... C08L 71/04; C08L 69/00
[52] U.S. Cl. .................................. 525/394; 524/841; 525/462; 525/905
[58] Field of Search ................. 525/394, 905, 462; 524/841; 528/202, 199

[56] References Cited

U.S. PATENT DOCUMENTS

| | | | |
|---|---|---|---|
| 3,342,892 | 9/1967 | Laakso et al. | 525/905 |
| 3,875,256 | 4/1975 | White | 525/462 |

*Primary Examiner*—Theodore E. Pertilla
*Attorney, Agent, or Firm*—Richard J. Traverso; James C. Davis, Jr.; James Magee, Jr.

[57] ABSTRACT

This invention relates to block copolymers of polyphenylene oxides and sterically-hindered aromatic polycarbonates. These block copolymers can be molded, calendered, or extruded as films, sheets, fibers, laminates or other useful articles of manufacture.

6 Claims, No Drawings

BLOCK COPOLYMERS OF POLYPHENYLENE OXIDES AND STERICALLY-HINDERED AROMATIC POLYCARBONATES

CROSS-REFERENCE TO RELATED APPLICATIONS

This application is a division of application Ser. No. 250,511, filed Apr. 2, 1981, now U.S. Pat. No. 4,377,662 dated Mar. 22, 1983.

This invention is related to U.S. Pat. No. 4,374,233 entitled "Block Copolymers of Polyphenylene Oxides and Non-Sterically-Hindered Aromatic Polycarbonates" filed concurrently herewith of George R. Loucks et al. Both applications are assigned to the assignee of this invention. All of the disclosure described therein is incorporated herein by reference in its entirety.

BACKGROUND OF THE INVENTION

1. Field of the Invention

This invention relates to block copolymers of polyphenylene oxides and sterically-hindered aromatic polycarbonates. These block polymers can be molded, calendered, or extruded as films, sheets, fibers, laminates or other useful articles of manufacture.

2. Description of the Prior Art

Low molecular weight bis(polyphenylene)-carbonate block copolymers having limited carbonate segment number average molecular weights, e.g. 250 to 5500, are well known and are described in D. M. White's U.S. Pat. No. 3,875,256. These polyphenylene oxide aromatic carbonate block copolymers are formed by the reaction of carbonyl halides or bishaloformates, e.g., phosgene or bis-chloroformates, respectively, with polyphenylene oxide in the presence of a hydrogen halide acceptor e.g., an alkali metal hydroxide, an alkaline earth metal hydroxide or oxide or a tertiary amine.

Monofunctional polyphenylene oxides having an average hydroxy group per molecule of 1.0 or less, are described in A. S. Hay's U.S. Pat. Nos. 3,306,979; 3,914,266; and 4,028,341, etc., among others.

Polyfunctional polyphenylene oxides having an average hydroxy group per molecule greater than zero including 2.0 or less are described in D. M. White's U.S. Pat. Nos. 4,140,675 and 4,234,706 among others.

DESCRIPTION OF THE INVENTION

This invention embodies block copolymers of polyphenylene oxides and sterically-hindered aromatic polycarbonates.

In general, illustrative of the broad group of block copolymers of polyphenylene oxides and sterically-hindered aromatic polycarbonates (hereinafter also referred to as "SH-aromatic-PC") included within the scope of this invention are those described among others by the following model structures:

$AZ(CZ)_x$, $BZ(CZ)_x$, $AC(CZ)_xA$, $AZ(CZ)_xB$,
$BZ(CZ)_xB$, $AZ(CZ)_xBZ(CZ)_xA$,
$AZ(CZ)_xBZ(CZ)_x(CZ)_xB$,
$AZBZ(CZ)_xBZ(CZ)_xBZA$, etc., etc., etc. (I)

wherein x is a number of at least 1, often from 10 to 200 or higher, preferably from 30 to 100 and frequently from 40 to 70.

The above illustrative linear combinations of mono- and polyfunctional polyphenylene oxides, SH-aromatic-PC and carbonyl halides including random and/or alternating arrangements of the polymer segments defined by the units A, B, $(CZ)_x$, or coupling agent Z, which units and coupling agents are described in greater detail hereafter are not intended to limit the combinations that can be obtained by the practice of this invention.

The expression polyphenylene oxides includes "monofunctional polyphenylene oxides" well known to those skilled in the art having an average hydroxy group per molecule value greater than zero including 1.0 or less. These polyphenylene oxides can be prepared by any of the methods of the prior art, and may be illustrated by formula (II) set out hereafter:

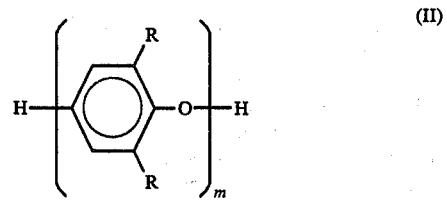

(II)

where independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (II) above wherein the hydrogen atom is disassociated from the monohydroxy group of the polyphenylene oxide, i.e., a phenoxy radical, which may be referred to as a monovalent phenoxy radical. These segments are abbreviated herein by unit-A.

The expression "polyphenylene oxide" also includes "polyfunctional polyphenylene oxides" also well known to those skilled in the art including quinone-coupled polyphenylene oxides having an average hydroxy group per molecule greater than zero including 2.0 or less. These polyphenylene oxides can be prepared by the methods described in U.S. Pat. No. 4,234,706 and may be illustrated by formula (III) set out hereafter:

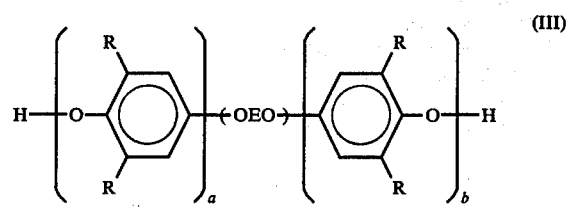

(III)

wherein independently —(OEO)— is a divalent quinone residue, E is a divalent arene radical, either a or b is at least equal to 1, the sum of a plus b is preferably at least equal to 10, more preferably 40 to 170, R is the same as in formula (II) above. The polyfunctional polyphenylene oxide units (segments) of the block polymers can be conceptualized by the structure of formula (III) above wherein the hydrogen atoms are disassociated from the hydroxy groups of the quinone-coupled polyphenylene oxide, i.e., a quinone-coupled polyphenoxy radical, which may be referred to as a divalent phenoxy radical. These segments are abbreviated herein by the unit —B—.

The expression "SH-aromatic-PC" as employed herein and in the claims includes any sterically-hindered aromatic polycarbonate derived from any sterically-hindered (SH)-dihydroxy aromatic compound. Sterically-hindered is defined herein as the presence of a halogen, hydrocarbon or hydrocarbonoxy group directly bonded to each carbon atom ortho-positioned (adjacent to) the carbon atoms directly bonded to the hydroxyl groups of the dihydric phenol. Sterically-hindered dihydric phenols known to those skilled in the art, described in detail in D. W. Fox's U.S. Pat. No. 3,153,008 and Great Britain Pat. No. 1,222,003, can be illustrated by formula (IV) set out hereafter.

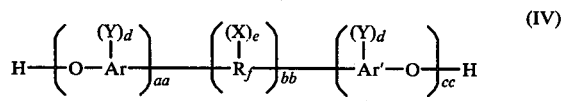
(IV)

where $R_f$ is an alkylene, alkylidene including "vinylidene", cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is bromine, chlorine or a monovalent alkyl or alkoxy group, d represents a whole number up to a maximum equivalent to the number of replaceable hydrogens substituted on the aromatic rings comprising Ar or Ar'—subject to the proviso that at least two Y groups are ortho-positioned relative to each —OH group of each arene radical, X is a bromine, chlorine or a monovalent hydrocarbon group selected from the class consisting of alkyl, aryl and cycloalkyl including mixtures thereof, e represents a whole number of from 0 to a maximum controlled by the number of replaceable hydrogens on $R_f$, aa, bb and cc represent whole numbers including 0, when bb is not zero, neither aa nor cc may be zero, otherwise either aa or cc but not both may be 0, when bb is zero, the aromatic groups can be joined by a direct carbon bond.

Examples of some sterically-hindred bis-phenols (hereinafter also referred to as "SH-dihydric phenols" or "SH-dihydroxy aromatic compounds") of formula (IV) are the following:
1,1-bis(4-hydroxy-3,5-dimethylphenyl) methane;
2,4'-dihydroxy-3,3',5,5'-tetramethyldiphenyl methane;
1,1-bis(3,5-diethyl-4-hydroxyphenyl) methane;
1,1-bis(3,5-diisopropyl-4-hydroxyphenyl) methane;
1,1-bis(3,5-dibromo-4-hydroxyphenyl) methane;
1,1-bis(3,5-dimethyl-4-hydroxyphenyl) ethane;
1,1-bis(3-methyl-5-ethyl-4-hydroxyphenyl) ethane;
1,1-bis(3,5-diethyl-4-hydroxyphenyl) ethane;
2,2-bis(3-methyl-5-ethyl-4-hydroxyphenyl) propane;
2,2-bis(3,5-dibromo-4-hydroxyphenyl) propane;
2,2-bis(3,5-diisopropyl-4-hydroxyphenyl) propane;
2,2-bis(4-hydroxy-3,5-dimethylphenyl) propane;
2,2-bis(3,5-dibromo-4-hydroxyphenyl) butane;
2,4'-dihydroxy-3,3',5',5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2-bis(3,5-dimethyl-4-hydroxyphenyl)-1-chloroethylene;
2,2-bis(3,5-dimethyl-4-hydroxyphenyl)-1,1-dichloroethylene; and
2,2-bis(3,5-dibutoxy-4-hydroxyphenyl)-1,1-dibromoethylene, etc.

The expression "SH-aromatic-PC" as employed herein and in the claims includes polycarbonates containing a major portion i.e., more than 50, and frequently 90-100 mol percent of SH-polycarbonate moities derived from SH-dihydroxy aromatic compounds and a minor portion, i.e., less than 50, and frequently 0-10 mol percent of NSH-polycarbonate moities derived from NSH-dihydroxy aromatic compounds. The NSH-dihydroxy aromatic compounds are described in detail in contemporaneously filed U.S. application Ser. No. (RD-12938) of George R. Loucks. For brevity, the disclosure of RD-12938 is incorporated herein in its entirety by reference. Some specific examples of some NSH-bisphenols (hereinafter also referred to as "NSH-dihydric phenols" or as "NSH-dihydroxy aromatic compounds") follow:
resorcinol;
4,4'-dihydroxy-diphenyl;
4,4'-dihydroxy-diphenyl methane;
4,4'-dihydroxy-diphenyl-1,1-ethane;
4,4'-dihydroxy-3-cyclohexyl-diphenyl-2,2-propane;
4,4'-dihydroxy-diphenyl-2,2-butane;
4,4'-dihydroxy-3,3'-dibromo-diphenyl-2,2 hexane;
4,4'-dihydroxy-diphenyl-1,1-cyclohexane;
4,4'-dihydroxy-diphenyl ether;
4,4'-dihydroxy-3,3'-dimethyldiphenylsulfide;
4,4'-dihydroxy-diphenyl sulfoxide;
4,4'-dihydroxy-3,3'-dichlorodiphenylsulfone;
2,2-bis(4-hydroxyphenyl)-1-chloroethylene;
2,2-bis(4-hydroxyphenyl)-1,1-dichloroethylene; and
2,2-bis(4-hydroxyphenyl)-1,1-dibromoethylene, etc.

The difunctional SH—(and NSH—, if present) aromatic-PC portions of the polymers derived from SH-dihydroxy aromatic compounds can be conceptualized by the SH-structure of formula (IV) above, (the NSH-structure formula (IV) set out in U.S. Pat. No. 4,374,233) or the NSH-specific examples above, wherein the hydrogen atoms are disassociated from the hydroxyl groups of the SH- and NSH-dihydroxy aromatic compounds, and are abbreviated herein by the formula —C—.

The expression "carbonyl halides" as employed herein and in the claims includes carbonyl dichloride—more commonly known as phosgene, carbonyl dibromide, carbonyl diiodide, carbonyldifluoride, carbonyl chlorofluoride, including mixtures thereof. The coupling agent of the block copolymers can be conceptualized by the

carbonyl radical wherein halogen atoms are disassociated from a carbonyl halide. These copolymer segments are abbreviated herein by the symbol —Z—.

The SH-aromatic polycarbonate segments associated with the block copolymers may be illustrated by formula (V) set out hereafter:

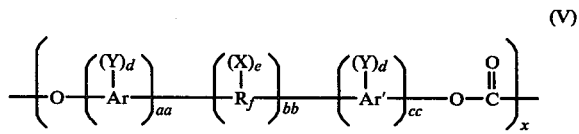
(V)

where $R_f$, Ar, Ar', Y, d, X, e, aa, bb, and cc are as defined above, and are referred to herein as divalent SH-aromatic polycarbonate radicals, abbreviated herein by the formula —(CZ)—$_x$ where C, Z and x are as previously defined.

Presently preferred SH-aromatic-PC units may be illustrated by formulas (VI) and (VII) set out hereafter:

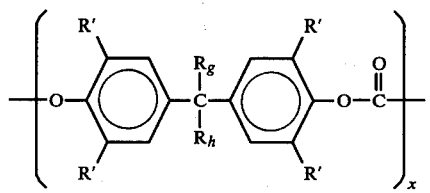

(VI)

and

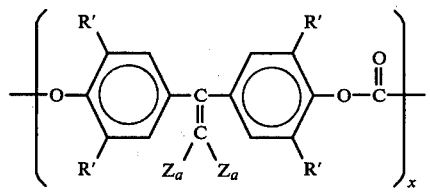

(VII)

where independently each R' is bromine, chlorine, or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine, and x is as previously defined.

The process of preparing the block copolymers of polyphenylene oxides and SH-aromatic-PC requires the combination of reactants in accordance with the following general process parameters:

(1) Forming an agitated, two-phase mixture comprising,
   (i) an organic phase containing a polyphenylene oxide, a SH-aromatic dihydroxy compound, an inert organic solvent, a tertiary amine catalyst and optionally, a NSH-aromatic dihydroxy compound and/or a phase transfer agent,
   (ii) an aqueous phase containing a solution of an alkali metal hydroxide having a pH value of at least about 10, preferably 11 to 13 or even higher,
(2) Adding and reacting a carbonyl halide with both the polyphenylene oxide and the SH-aromatic dihydroxy compound—plus any, optional NSH-aromatic dihydroxy compound, to form a block copolymer, and
(3) Recovering the polyphenylene oxide and SH-aromatic polycarbonate block copolymer.

The process parameter related to pH is maintained throughout the course of the reaction, by any means, such as, optionally, by the initial addition of large excesses of alkali metal hydroxide including the substantially continuous addition of alkali metal hydroxide during the course of the reaction, e.g., concurrently with the carbonyl halide addition.

Any inert solvent can be used including medium polar solvents, such as chlorobenzene, bromobenzene, ortho-dichlorobenzene, methylene chloride, 1,2-dichloroethane, iodobenzene, etc., and mixtures thereof. Preferably the solvents employed are halogenated hydrocarbons, more preferably methylene chloride.

The interfacial polycondensation and coupling process of this invention is carried out in any strongly basic reaction medium i.e., pH 10 or higher, provided by the presence of a strong inorganic base, including mixtures thereof. Representative of basic species which can be employed are the following: basic quaternary ammonium, quaternary phosphonium or tertiary sulfonium hydroxide; alkali metal hydroxides; etc. Specific examples are tetramethyl ammonium hydroxide, tetraethyl phosphonium hydroxide, etc.; the lithium, sodium and potassium hydroxides, etc. Especially preferred are sodium or potassium hydroxide.

Any tertiary amine can be employed. Illustrative of tertiary amines are the following: trimethylamine, triethylamine, allyldiethylamine, benzyldimethylamine, dioctylbenzylamine, dimethylphenethylamine, 1-dimethylamino-2-phenylpropane, N,N,N',N'-tetramethylethylenediamine, N-methylpiperidine, 2,2,6,6,N-pentamethylpiperidine, etc. Presently preferred are aliphatic amines, especially triethyl amine.

Optionally, however, not essential to the process of this invention, a phase transfer agent can be employed to enhance the process reaction rate. Preferably, the phase transfer agent is selected from the group consisting of quaternary ammonium, quaternary phosphonium, and tertiary sulfonium compounds or mixtures thereof. These phase transfer agents are well known and include illustratively "onium compounds" described by C. M. Starks in J.A.C.S. 93, 195 (1971). Specific illustrative examples are described in U.S. Pat. No. 4,201,721 whose descriptions are incorporated herein in their entirety by reference.

Any amount of functionally reactive polyphenylene oxide, SH-dihydric aromatic compound and carbonyl halide can be employed, subject to the proviso that the carbonyl halide is present in stoichiometric amounts at least sufficient to react with the hydroxy groups associated with the polyphenylene oxide and the aromatic dihydroxy compounds. Preferably, the carbonyl halide is present in excess i.e., at least about 3 times to as much as 4 to 5 times the stoichiometric amounts required to completely couple all of the reactive polyphenylene oxide and aromatic dihydroxy compounds.

Any amount of base can be employed subject to the proviso that the agitated two-phase mixture is maintained at a pH value in excess of about 10, preferably within the range of 11–13, and, optionally, as high as 14. Generally effective mol proportions of base relative to the hydroxyl groups associated with the polyphenylene oxide and the aromatic dihydroxy compounds are within the range from about 2:1 to 10:1, and frequently preferably are from about 3:1 to 5:1.

Any amount of tertiary amine can be employed, however, generally effective mole proportions of amine relative to the dihydroxy aromatic compound are within the range of from about 0.03:1 to 0.25:1 and more frequently, preferably are within the range of from about 0.05:1 to about 0.15:1.

Any amount of phase transfer agent can be employed, however, generally effective mole proportions of the phase transfer agent relative to the base are within the range of from about 1:10 to about 1:1000 and more frequently, preferably, are within the range of from about 1:100 to 1:500.

The reactions can be carried out at any temperature. Preferably, temperatures within the range of from about 0° to 100° C. or even higher, and more preferably from 20° C. to 100° C. are employed.

The best mode of practicing this invention is set out in the Examples hereinafter.

EXAMPLE 1

(A) Preparation of mono-Functional Polyphenylene Oxide

A 2.5 gallon stainless steel reactor equipped with an air-driven paddle stirrer, oxygen inlet tube, and water-cooled coil and jacket was charged with 2.3 liters of toluene, 150 g. 2,6-xylenol, 4.2 ml. of stock catalyst solution, i.e. (19.31 g. cuprous oxide added slowly with stirring to 100 ml. of a 47.2% aqueous hydrogen bromide (HBr) solution), 3.4 g. N,N'-di(t-butyl)ethylene diamine (DBEDA), 47.5 g. N,N-dimethylbutylamine (DMBA), 1.5 g. di(n-butyl)amine (DBA) and 1.5 g. tricaprylylmonomethylammonium chloride (Adogen 464). Oxygen was bubbled into the resulting admixture at a rate of 8.3 moles per hour while vigorously agitating the admixture, and 1350 g. of 2,6-xylenol dissolved in 1.5 liters of toluene was pumped into the reactor over a 30 minute period. The temperature rose from 25° to 35° C. The polymerization reaction was terminated by replacing the oxygen stream with nitrogen and adding 15 ml. of a 38% aqueous solution of trisodium ethylenediaminetetraacetate ($Na_3EDTA$). The resulting reaction mixture was heated at 50°-55° C. under nitrogen for about one and one-half hours and the polymer was precipitated by adding three volumes of methanol. The precipitated polymer was filtered and washed with methanol yielding a white solid reaction product having an intrinsic viscosity of 0.24 dl./g. measured in chloroform at 25° C. From the infrared absorption spectrum of the polymer at 3610 $cm^{-1}$ an average hydroxyl content of 1.1 —OH groups per polymer chain was calculated. Molecular weight determination by GPC analysis based on a polystyrene calibration furnished the following data:

$\overline{M}w = 17,260$ $\overline{M}n = 8,800$ $\overline{M}w/\overline{M}n = 1.96$

(B) Preparation of Poly-Functional Polyphenylene Oxide

A 500 ml. 3-neck round-bottom flask equipped with condenser, $N_2$ "bubbler" and mechanical stirrer was charged with 50.0 g. of mono-functional polyphenylene oxide—prepared as described in (A) above, 1.72 g. TMDQ (tetramethyl-diphenoquinone) and 200 ml. of toluene. The mixture was heated under $N_2$ at 65°-70° C. for 3.5 hours. The solution was diluted with 150 ml. of toluene and transferred to a 1 quart Waring blender. With vigorous agitation, the polymer was coagulated by addition of 1 liter of methanol. The light yellow product was twice reslurried in methanol, then collected and dried in vacuo at approximately 50° C. overnight. The polymer had an intrinsic viscosity of 0.28 dl./g. measured in chloroform at 25° C. From an infrared absorption spectrum at 3610 $cm^{-1}$ an average hydroxyl content of 1.8 —OH groups per polymer chain was calculated. Molecular weight determination by GPC analysis based on a polystyrene calibration furnished the following data:

$\overline{M}w = 23,890$ $\overline{M}n = 8,560$ $\overline{M}w/\overline{M}n = 2.79$

EXAMPLE 2

(A) Preparation of Block Copolymers of Polyphenylene Oxides and Sterically-Hindered Aromatic Polycarbonates A series of block copolymers was generally prepared according to the following detailed procedure with respect to Run No. I, further described in Tables I and II, which also follow:

A 300 ml. 5-neck round-bottom flask equipped with a mechanical stirrer, condenser, pH probe, caustic addition funnel and phosgene inlet tube was charged with 2.31 g. mono-functional polyphenylene oxide—prepared as described in EXAMPLE 1(A) above, and 45 ml. of methylene chloride. The mixture was stirred and heated to reflux, i.e., approximately 40° C., and 8.52 g. of bis(4-hydroxy-3,5-dimethylphenyl)propane-2,2, 50 ml. of water, and 0.30 g. of triethylamine were added. The pH of the mixture was adjusted to 13 by the addition of 1.5 ml. of a 50% sodium hydroxide solution. Phosgene was passed through the agitated mixture at 0.21 g. per minute from a calibrated flow meter while adding approximately 12 ml. of a 50% sodium hydroxide solution—during the course of the reaction—in order to maintain a relatively constant pH value of 13. After 60 minutes the phosgene flow was stopped, the flask was purged with nitrogen, and the viscous solution diluted with 50 ml. of chloroform. The organic phase was added to 5 volumes of methanol in a high speed mixing blender. The resulting block copolymer was filtered, washed several times with water and methanol, and dried overnight in vacuo at approximately 60° C. The polymer had an intrinsic viscosity of 0.72 dl./g. measured in chloroform at 25° C. Molecular weight was determined by GPC analysis based on a polystyrene calibration.

A 0.75 g. sample of the resulting block copolymer was compression molded into a disc 1 mm. thick and 2.5 cm. in diameter at 270° C. and 5000 psi in a laboratory press. The disk was transparent.

A film cast from a solution of the block copolymer in chloroform was also transparent and flexible.

A resume of the product reaction parameters and product properties are set out in Tables I and II, respectively, which correspond to a series of runs carried out in a manner analogous to that described in detail above.

TABLE I

| | REACTION PARAMETERS | | | | | |
|---|---|---|---|---|---|---|
| Run No. | TMBPA (g) | PPO (g) | PPO [η] | TEA (g) | $CCCl_2$ (g) | $H_2O$ (ml) | $CH_2Cl_2$ (ml) |
| I | 8.52 | 2.31(A) | 0.24 | 0.30 | 12.6 | 50 | 45 |
| II | 5.40 | 5.60(A) | 0.24 | 0.20 | 8.4 | 50 | 45 |
| III | 2.70 | 8.40(A) | 0.24 | 0.11 | 4.8 | 50 | 45 |
| IV | 8.70 | 2.31(B) | 0.28 | 0.32 | 12.6 | 45 | 50 |
| V | 2.70 | 8.40(B) | 0.28 | 0.11 | 4.8 | 50 | 45 |

TABLE II

| | COPOLYMER PROPERTIES | | | | | | | |
|---|---|---|---|---|---|---|---|---|
| | | | | | Wt. | GPC Data | | |
| Run No. | Yield (g) | % Yield | [η] | Tg (°C.) | % PPO | $\overline{M}w$ | $\overline{M}n$ | $\overline{M}w/\overline{M}n$ |
| I | 11.3 | 97.4 | 0.72 | 209 | 20.5 | 83,790 | 30,700 | 2.73 |
| II | 11.1 | 98.8 | 0.62 | 210 | 48.5 | 68,150 | 25,600 | 2.66 |

TABLE II-continued

| | | COPOLYMER PROPERTIES | | | | | | |
|---|---|---|---|---|---|---|---|---|
| | | | | | Wt. | GPC Data | | |
| Run No. | Yield (g) | % Yield | [η] | Tg (°C.) | % PPO | $\overline{Mw}$ | $\overline{Mn}$ | $\overline{Mw}/\overline{Mn}$ |
| III | 10.9 | 97.6 | 0.43 | — | 72.7 | 37,720 | 16,360 | 2.31 |
| IV | 11.4 | 99+ | 0.85 | — | 19.3 | 123,700 | 39,400 | 3.14 |
| V | 10.2 | 91.6 | 0.54 | — | 75.1 | 74,180 | 19,270 | 3.85 |

Gel permeation chromotography (GPC) molecular weight distribution curves for the block copolymers revealed no bimodal molecular weight distributions and no "shoulders" on either the high or low molecular weight sides of the curves. Superimposition of the chromatograms of the very high molecular weight copolymers of Runs I and IV and the chromatograms of the starting polyphenylene oxide revealed the presence of very little unreacted polyphenylene oxide i.e., only a slight "tailing" on the low molecular weight end was observed.

Proton NMR analysis of the block copolymers revealed that substantially all, i.e., 95% or more, of the polyphenylene oxide and tetramethyl bisphenol-A was incorporated in the block copolymers.

A qualitative analysis of the block copolymers—based upon the observation that a chloroform solution of the block copolymers remain colorless after standing for more than a week—provided evidence that substantially all of the polyphenylene oxide hydroxyl end-groups were coupled with the polycarbonate segments of the block copolymers.

All discs and films of the block copolymers of Runs II–V were transparent. All films were flexible.

A summary of the solid solution properties of the block copolymers is set out in Table III.

TABLE III

| BLOCK COPOLYMER | | |
|---|---|---|
| PPO (Wt.%) | TMBPA (Wt.%) | SOLID SOLUTION |
| 1 to 100 | 100 to 1 | Transparent (single phase) |

COMPARATIVE DATA—NOT PART OF THIS INVENTION

A series of blends of homopolymers of poly(2,6-dimethyl-1,4-phenylene oxide) also referred to herein as polyphenylene oxide ("PPO"), and homopolymers of bis(4-hydroxy-3,5-dimethylphenyl)propane-2,2 also referred to herein as tetramethylbisphenol-A polycarbonate ("TMBPA-PC") were prepared according to the following general procedure.

Compression molded discs were prepared from PPO and TMBPA-PC by dissolving the polymers in a suitable solvent, e.g., chloroform, (2) precipitating the polymer blends by the addition to an antisolvent e.g., methanol, (3) drying the resulting blends under vacuum at 50°-60° C. overnight, and (4) compression molding 0.75 grams of the polymer mixtures into discs 1 mm. thick and 2.5 cm. in diameter at 270° C. and 5000 psi in a laboratory press. The resulting discs—depending upon the proportions of the respective homopolymers present in blends—were found to be either transparent (indicating a solid solution single phase) or translucent (indicating a multiple phase solid solution).

A summary of the solid solution properties of the blends of the homopolymers is set out in Table IV.

TABLE IV

| HOMOPOLYMER BLENDS | | |
|---|---|---|
| PPO (Wt.%) | TMBPA (Wt.%) | SOLID SOLUTION |
| 0 to 10 | 100 to 90 | Transparent (single phase) |
| >10 to <90 | <90 to >10 | Translucent (multiple phase) |
| 90 to 100 | 10 to 0 | Transparent (single phase) |

The polyphenylene oxide employed in the blends was commercially manufactured in accordance with the process parameters described in A. S. Hay's U.S. Pat. No. 4,048,143. The specific polymer employed exhibited an intrinsic viscosity of 0.50 dl./g. measured in chloroform at 25° C.

The tetramethyl-bisphenol-A polycarbonate employed in the blends was prepared in accordance with the following detailed procedure.

A 300 ml. 5-neck round-bottom flask equipped with a mechanical stirrer, condenser, pH probe, caustic addition funnel and phosgene inlet tube was charged with 45 ml. of methylene chloride, 9.10 g. of bis(4-hydroxy-3,5-dimethylphenyl)propane-2,2, 50 ml. of deionized water, 0.32 g. of triethylamine and 0.1 g. of 2,3,6-trimethylphenol. The pH of the mixture was adjusted to 13 by the addition of a 50% sodium hydroxide solution. Phosgene was passed through the agitated mixture at 0.21 g. per minute from a calibrated flow meter while adding sufficient amounts—during the course of the reaction—of 50% caustic in order to maintain a relatively constant pH value of 13. After 60 minutes the phosgene flow was stopped, the flask was purged with nitrogen, and the viscous solution diluted with methylene chloride. The organic phase was added to 6 volumes of methanol in a high speed mixing blender. The resulting polycarbonate was filtered, washed several times with water and methanol, and dried overnight in vacuo at approximately 60° C. The polymer had an intrinsic viscosity of 0.50 dl./g. measured in chloroform at 25° C. Molecular weight determination by GPC analysis based on a polystyrene calibration furnished the following data:

$\overline{Mw} = 50,990$ $\overline{Mn} = 17,460$ $\overline{Mw}/\overline{Mn} = 2.92$ The block copolymers of polyphenylene oxide and sterically-hindered aromatic polycarbonates of this invention preferably exhibit intrinsic viscosities greater than about 0.3 dl./g. measured in chloroform at 25° C. Preferably these block copolymers generally exhibit a SH-aromatic polycarbonate segment —(CZ)—$_x$ number average degree of polymerization ($\overline{DP}_n$) equal to about 30 at block copolymer intrinsic viscosities of 0.3 dl./g. and a $\overline{DP}_n$ of about 50 at block copolymer intrinsic viscosities of about 0.7 dl./g. measured in chloroform at 25° C.

The block polymers of this invention can be molded, calendered, or extruded as films, sheets, fibers, laminates or other useful articles of manufacture at temperatures of about 500° F. to about 650° F. employing conventional processing equipment for engineering thermoplastic materials including extruders, e.g. mono and multiple screw types, mills or other mechanical equipment which subject engineering thermoplastic materials to high sheer stress at elevated temperatures.

I claim:

1. A process of forming a block copolymer of polyphenylene oxide and a sterically-hindered aromatic polycarbonate comprising the following process sequence:
   (1) Forming an agitated two-phase mixture comprising,
      (i) an organic phase containing a polyphenylene oxide, a sterically hindered aromatic dihydroxy compound, an inert organic solvent, a tertiary amine, and, optionally, a non sterically hindered aromatic dihydroxy compound,
      (ii) an aqueous phase containing a solution of an alkali metal hydroxide having a pH value of at least 10,
   (2) Adding and reacting a carbonyl halide with both the polyphenylene oxide and the sterically hindered aromatic dihydroxy compound plus any, optional non-sterically hindered aromatic dihydroxy compound to form a block copolymer, the quantity of said carbonyl halide being sufficiently large to react with all the aromatic dihydroxy compounds, and
   (3) Recovering the polyphenylene oxide and sterically hindered aromatic polycarbonate block copolymer.

2. The claim 1 process wherein a sterically hindered aromatic hydroxy compound is present as a major portion relative to a minor portion of a non-sterically hindered aromatic dihydroxy compound.

3. The claim 2 process wherein the sterically hindered aromatic dihydroxy compound portion is at least 90 mol percent.

4. The claim 3 process wherein the polyphenylene oxide is poly(2,6-dimethyl-1,4-phenylene oxide) and the sterically hindered aromatic dihydroxy compound is bis(4-hydroxy-3,5-dimethylphenyl)propane-2,2.

5. The claim 4 process wherein the alkali metal hydroxide is sodium hydroxide and the tertiary amine is triethylamine.

6. The claim 5 process wherein a phase transfer agent is present.

* * * * *